United States Patent [19]

Kenney et al.

[11] Patent Number: 4,725,525

[45] Date of Patent: Feb. 16, 1988

[54] RECORDING INFORMATION MEDIA COMPRISING CHROMOPHORES

[75] Inventors: Malcolm E. Kenney, Cleveland Heights, Ohio; R. Sidney Jones, Jr., Randolph, N.J.; James E. Kuder, Fanwood, N.J.; David E. Nikles, Colonia, N.J.

[73] Assignee: Hoebbst Celanese Corporation, Somerville, N.J.

[21] Appl. No.: 883,273

[22] Filed: Jul. 7, 1986

Related U.S. Application Data

[63] Continuation of Ser. No. 698,206, Feb. 4, 1985, abandoned.

[51] Int. Cl.$^4$ ............... G03C 1/72; G03F 7/26; G01D 9/00
[52] U.S. Cl. .................... 430/270; 430/338; 430/346; 430/495; 430/945; 430/964; 346/135.1
[58] Field of Search .......... 430/270, 338, 945, 964, 430/495, 321, 322, 346; 346/76 L, 135.1

[56] References Cited

U.S. PATENT DOCUMENTS

| | | | |
|---|---|---|---|
| 4,458,004 | 7/1984 | Tanikawa et al. | 430/495 |
| 4,492,750 | 1/1985 | Law et al. | 430/495 |
| 4,622,179 | 11/1986 | Eda | 540/139 |

FOREIGN PATENT DOCUMENTS 0134518  3/1985  European Pat. Off. .

OTHER PUBLICATIONS

*Japanese J. of Applied Physics,* part 1, vol. 22, No. 2, 2/1983, Kutoiwa et al., "Reversible Read-Write . . . Media", pp. 340-343.

Schechtman, "Conducting Poly(metallonaphthalocyanines) . . . ", 8/1983, Thesis Case Western Reserve U.

Mikhalen Ko et al., "Synthesis . . . Naphthalocyanines", *Zhornal Obsheheikhimii,* vol. 39, No. 11, 11/1969, pp. 2554-2558.

*Primary Examiner*—Richard C. Schilling
*Attorney, Agent, or Firm*—Burns, Doane, Swecker & Mathis

[57] ABSTRACT

Provided is an information recording medium and a method for recording information thereon. The information layer of the recording medium comprises a naphthalocyanine chromophore, e.g., a sulfonamidonaphthalocyanine having silicon or germanium as the central hetero atom. Information can thereby be readily recorded via a thermal deformation technique due to the effective absorption by the dye of light in the wavelength range of about 760-850 nm. The naphthalocyanine chromophores exhibit excellent chemical and photolytic stability, their use thereby increasing the useful life of the recording medium.

Provided herein are also novel naphthalocyanine chromophore compounds which are useful in optical recording media, and which exhibit exceptional solubility characteristics. Such chromophores are thereby readily applied as a film in the formulation of an information recording medium.

16 Claims, No Drawings

RECORDING INFORMATION MEDIA COMPRISING CHROMOPHORES

This application is a continuation of application Ser. No. 698,206, filed Feb. 4, 1985, now abandoned.

BACKGROUND OF THE INVENTION

1. Field of the Invention

This invention relates to a novel optical recording medium and the recording of information thereon. More particularly, the present invention relates to an information recording medium, preferably in the form of a disk or in tape format, suitable for use with optical recording and playback apparatus, the information layer of which comprises a naphthalocyanine chromophore. The present invention also relates to novel compounds, and in particular naphthalocyanine chromophores, which are useful in optical recording media.

2. Description of the Prior Art

Optical recording methods in which light from a laser is focused upon the surface of a recording medium with sufficient intensity to cause a detectable change in the physical characteristics of the surface material have been proposed. Among these methods is the establishment of an information pattern of pits. In such methods, the information representative pattern of pits may be formed in the surface of the recording medium by suitably controlling the intensity of the focused light in accordance with the information to be recorded while relative motion is established between the recording medium and the focused light spot.

For instance, in recent years, attention has been increasingly paid to the information recording method in which information is written in a thin film of metal or the like formed on a substrate by using a laser ray or beam. According to such a method, the information recording has been accomplished by forming holes or recesses in the metallic thin film under the action of a thermal energy beam such as a laser ray. See, e.g., U.S. Pat. No. 4,238,803.

Dyes and pigments have also been employed in information layers of recording media, often to enhance the sensitivity of the recording layers at the particular wavelength of the laser being used, which results in a much sharper recording and playback of the information.

For example, Spong, U.S. Pat. No. 4,097,895, describes a recording medium which comprises a light reflecting material, such as aluminum or gold, coated with a dye-containing light absorbing layer, such as fluorescein, which is operative with an argon laser light source. The thickness of the light absorbing layer is chosen so that the structure has minimum reflectivity. An incident light beam then creates a hole in the light absorbing layer, exposing the light reflecting layer. After recording at the wavelength of the recording light, maximum contrast between the minimum reflectance of the light absorbing layer and the reflectance of the light reflecting layer exists. In this regard, note also U.S. Pat. No. 4,219,826.

Carlson, in U.S. Pat. No. 3,475,760, discloses a system for directly recording information in a thermoplastic film as a deformation by using a high energy laser scanning beam of small diameter. It is further disclosed that the sensitivity of the films for laser film deformation recording can be enhanced by the addition of pigments or dyes which exhibit a high absorption at the laser wavelength. Erasure of the film deformation is accomplished by recording over the information to be erased using a similar laser beam but with a much smaller scan line spacing, preferably so as to provide overlap of the scan lines.

Other U.S. patents which disclose the use of a light absorbing dye in the recording layer include U.S. Pat. Nos. 4,412,231 and 4,446,223. The former patent discloses using a mixture of dyes having different light absorbing wavelengths so that the resulting recording layer has a light absorptivity of 80% or more at all the wavelengths in the range of from 400–900 nm. The latter patent discloses an optical information recording element comprising a support coated with a layer of an amorphous composition, which composition comprises a binder and an oxoindolizine or oxoindolizinium dye.

In a paper entitled "Single Wavelengths Optical Recording in Pure, Solvent Coated Infrared Dye Layers" by Gravesteijn, Steenbergen and van der Veen, experiments on the use of certain dyes for optical recording for digital and video applications at GaAlAs laser wavelengths are reported. The paper was presented at the Proceeding of the SPIE, "Optical Storage Media", volume 420, June 6–10, 1983. The specific dyes discussed in the paper are squarylium dyes and pentamethine dyes. It is further suggested in the paper that the solubility of the squarylium dyes in organic solvents can be greatly increased by the introduction of t-butyl groups into thiopyrylium end groups.

The use of dyes in conjunction with optical recording media comprising a styrene oligomer is disclosed in the article by Kuroiwa et al appearing in the *Japanese Journal of Applied Physics*, Vol. 22, No. 2, February 1983, pp. 340–343. Among the dyes and pigments discussed as being useful is a copper phthalocyanine pigment. Phase separation and incompatibility between the dyes and oligomers were noted in the article as being problems in the use of dyes for optical information media.

Lee Arnold Schechtman in his thesis *Compounds, Poly(metallonaphthalocyanines) and Related Macrocyclic Compounds*, August, 1983, Dept. of Chemistry, Case Western Reserve University, discloses a particular chromophore which absorbs light at the wavelength of about 770 nm, i.e., bis-tri-n-hexylsiloxysilicon naphthalocyanine. The suitability of such a chromophore for use in an optical recording medium, however, has heretofore not been suggested or explored.

S. A. Mikhalenko and E. A. Luk'yanets in "Phthalocyanines and Related Compounds II. Synthesis and Certain Properties of 2,3-naphthalocyanines", *Zhurnal Obshchei Khimii*, Vol. 30, No. 11, pp. 2554–2558, November, 1969, disclose certain substituted 2,3-naphthalocyanines. The suitability of such compounds for use in optical recording media, however, is not suggested therein. Note also Vogler and Kunkely, "Template Synthesis and Optical Spectra of Zinc-2,3-naphthalocyanine", *Inorganica Chemica Acta*, 44 (1980), L209–L210.

The recording medium, of course, is one of the key elements in any optical recording system, i.e., a system in which the information is recorded or read by light. Such system would have a usefulness in the storage of audio and video information, data processing and document processing. The commercial viability of an optical recording medium would of course depend upon such technical parameters as the sharpness in recording and playback of the information, i.e., a high signal to noise ratio, as well as the useful life of the information medium. Maintaining the sensitivity of a recording medium throughout the cycles of record-read-erase is also an important consideration.

While dyes or pigments have been employed in information storage layers of recording media due to their excellent absorption properties, the search for an improved information storage medium comprising a dye or pigment exhibiting stability and intense absorption at specified wavelengths is continuously ongoing. The sensitivity of the dye recording media often degrades due to the chemical or photolytic instability of the dye material used. Thus, the useful life of the recording medium is cut short. Furthermore, the ability of the dye to be applied in a polymer film is often a problem due to the lack of solubility in conventional solvents. Attempts to alter the dye molecule, however, often result in an undesirable change in its spectral properties.

Accordingly, it is a major object of the present invention to provide a novel recording medium which comprises a dye or pigment in the information layer.

Yet another object of the present invention is to provide a dye material for use in an information layer of an optical recording medium which exhibits excellent absorption properties.

Still another object of the present invention is to provide a novel dye material which exhibits excellent absorption properties at a wavelength ranging from about 760–850 nm.

It is still another object of the present invention to provide a dye containing recording medium which has excellent stability and can thereby provide a longer useful life.

It is yet another object of the present invention to provide a dye containing erasable recording medium which maintains its sensitivity through multiple record-read-erase cycles.

It is still another object of the present invention to provide novel chromophore compounds which are useful in optical recording media.

Yet another object of the present invention is the provision of chromophore compounds exhibiting excellent solubility characteristics so that they might readily be applied as a film onto a substrate, thereby enhancing their applicability as a recording layer in an optical recording medium.

These and other objects, as well as the scope, nature and utilization of the invention, will be apparent to those skilled in the art from the following description and the appended claims.

SUMMARY OF THE INVENTION

In accordance with the foregoing objectives, provided hereby is a recording medium for use with a recording laser providing light of a predetermined frequency, wherein the information layer of the recording medium comprises a naphthalocyanine chromophore. The use of the naphthalocyanine chromophore allows for the intense absorption of light at a specified wavelength, i.e., in the range of from about 760–850 nm. Such intense absorption provides for a very sensitive recording medium, thereby permitting detailed information to be recorded with a high signal to noise ratio upon playback. Accordingly, the commercial viability of the medium is enhanced. The surprising chemical and photolytic stability of the chromophores also enhance the desirability and commercial viability of the recording medium of the present invention in extending its useful life. Optical recording media employing the naphthalocyanine chromophores of the present invention are also adaptable to an erasable system.

The present invention also provides novel naphthalocyanine chromophores which exhibit excellent chemical and photolytic stability and which are quite useful in optical recording media. The novel chromophores also exhibit excellent solubility characteristics rendering them readily applicable as a recording layer film.

In another embodiment of the present invention there is provided a method of recording information in a thin film, deposited on a relatively thick substrate, by irradiating the film with laser beam in accordance with the said information to form pits in the film, the improvement which comprises said film being comprised of a naphthalocyanine chromophore.

DETAILED DESCRIPTION OF THE PREFERRED EMBODIMENTS

The dye employed in the information layer of the recording medium of the present invention is a naphthalocyanine chromophore. Any isomer of naphthalocyanine is contemplated for the purposes of the present invention. Such chromophores exhibit intense absorption of light at wavelengths in the range of from about 760–850 nm. The preferred chromophores are generally of the structural formula:

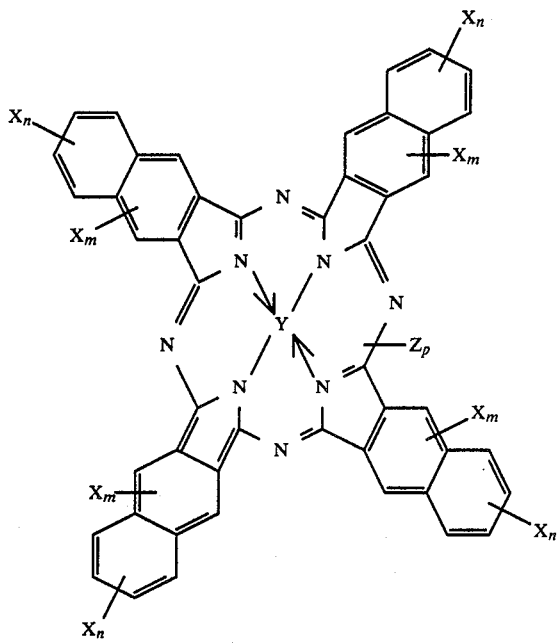

wherein
Y is Si, Ge, Sn, Al, Ga, In or a transition metal, preferably a six-coordinate transition metal, e.g. Ti, Zr, Hf;
Z is halogen; hydroxy; $OR_1$ or $OSiR_2R_3R_4$,
wherein $R_1$ is an alkyl having at least four carbons and preferably from 6 to about 30 carbons; aryl having at least 6 carbons and preferably from 6 to 10 carbons; acyl having at least 4 carbons and preferably from 6 to about 18 carbons; cycloalkyl having at least four carbons and preferably from 6 to 10 carbons; or a polyether, preferably having 10 or fewer repeat units with propylene oxy and ethylene oxy being the preferred repeat units; and, wherein $R_2$, $R_3$ and $R_4$ can be the same or different and are alkyl having from 1 to about 18 carbons, preferably from 4 to 8 carbons; aryl having from 6 to 10 carbons; cycloalkyl having at least 4 carbons and preferably from 4 to 6 carbons; siloxy; or alkoxy having at least 3 carbons and preferably from 6 to about 18 carbons;

with p representing the number of Z substituents and being either 0, 1 or 2; and wherein the X substituents can be the same or different and are independently selected from halogen; alkyl having at least 4 carbons and preferably from 4 to about 18 carbons; aryl, preferably having from 6 to 10 carbons; acyl having at least 4 carbons and preferably from 4 to about 18 carbons; $NR_5R_6$; $NO_2$; $OR_7$; $SO_3^-$; or $SO_2NR_5R_6$, with $R_5$ and $R_6$ being the same or different and being H; alkyl having from one to about 18 carbons and preferably from one to about 8 carbons; cycloalkyl having at least 4 carbons and preferably from 5 to 6 carbons; aryl having from 6 to 10 carbons; or with $R_5$ and $R_6$ being taken together to form a heterocyclic ring containing the N atom and containing from 4 to 7 members, and preferably from 5 to 6 members, and where the X substituent is attached to the aromatic ring through the N atom when the substituent is $NR_5R_6$, $R_7$ can be the same as $R_1$ defined above, and with n and m indicating the number of independently selected X substituents, each n being the same or different and ranging from 0 to 4, and each m being the same or different and ranging from 0 to 2.

The preferred naphthalocyanine chromophores for use in the present invention are those substituted with a sulfonamide, halogen or amine substituent, with a sulfonamidonaphthalocyanine chromophore being the most preferred. The number of substituents preferably ranges anywhere from 0 to 8 substituents.

While the central hetero atom of the naphthalocyanine chromophore can be any element selected from Si, Sn, Ge, Al, Ga, In or a transition metal, it is preferred that the central hetero atom be silicon, germanium, tin, gallium or aluminum, with silicon, germanium and tin being the most preferred central hetero atoms.

Seven specific chromophores found to be of particular utility in the practice of the present invention are bis[tri-n-hexylsiloxy] silicon naphthalocyanine;

dichlorosilicon poly-N-di-n-octylsulfonamidonaphthalocyanine;

dihydroxysilicon poly-N-di-n-octylsulfonamidonaphthalocyanine, bis[tri-n-hexylsiloxy] silicon poly-N-di-n-octylsulfonamidonaphthalocyanine, bis[hydroxyheptapropyleneoxydimethylsiloxy] silicon tetrachloronaphthalocyanine, bis[trihexylsiloxy] silicon tetra neopentoxynaphthalocyanine, and, bis[trihexylsiloxy] silicon tetra-N-piperidyl naphthalocyanine.

The last six of the aforementioned compounds are also novel compounds heretofore unknown to the art. Indeed, the novel naphthalocyanine compounds of the present invention exhibit surprising solubility characteristics and have the following structural formula:

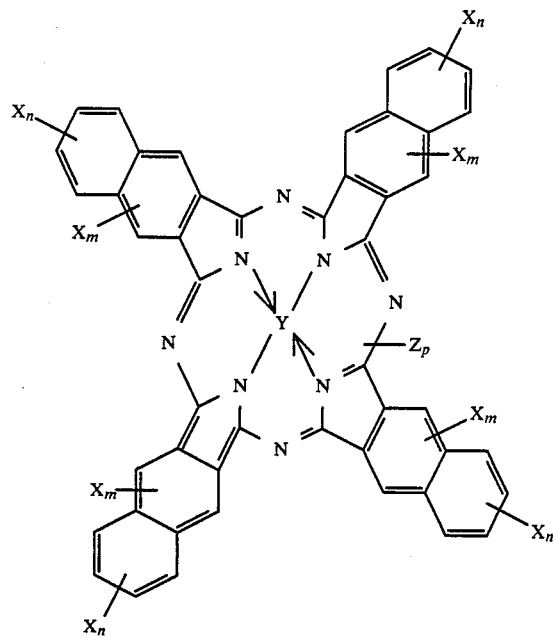

wherein

Y is Si, Ge, Sn, Al, Ga, In or a six coordinate transition metal;

Z is halogen; hydroxy; $OR_1$ or $OSiR_2R_3R_4$, wherein $R_1$ is an alkyl having at least four carbons and preferably from 6 to about 30 carbons; aryl having at least 6 carbons and preferably from 6 to 10 carbons; acyl having at least 4 carbons and preferably from 6 to about 18 carbons; cycloalkyl having at least four carbons and preferably from 6 to 10 carbons; or a polyether, preferably having 10 or fewer repeat units with propylene oxy and ethylene oxy being the preferred repeat units; and wherein $R_2$, $R_3$ and $R_4$ can be the same or different and are alkyl having from 1 to about 18 carbons, preferably from 4 to 8 carbons; aryl having from 6 to 10 carbons; cycloalkyl having at least 4 carbons and preferably from 4 to 6 carbons; siloxy; or alkoxy having at least 3 carbons and preferably from 6 to about 18 carbons;

with p representing the number of Z substituents and being either 1 or 2; and wherein the X substituents can be the same or different and are independently selected from halogen; alkyl having at least 4 carbons and preferably from 4 to about 18 carbons; aryl, preferably having from 6 to 10 carbons; acyl having at least 4 carbons and preferably from 4 to about 18 carbons; $NR_5R_6$; $NO_2$; $OR_7$; $SO_3^-$; or $SO_2NR_5R_6$, with $R_5$ and $R_6$ being the same or different and being H; alkyl having from one to about 18 carbons and preferably from one to about 8 carbons; cycloalkyl having at least 4 carbons and preferably from 5 to 6 carbons; aryl having from 6 to 10 carbons; or with $R_5$ and $R_6$ being taken together to form a heterocyclic ring containing the N atom and containing from 4 to 7 members, and preferably from 5 to 6 members, and where the X substituent is attached to the aromatic ring through the N atom when the substituent is $NR_5R_6$;

$R_7$ can be the same as $R_1$ defined above, and with n and m indicating the number of independently selected X substituents, each n being the same or different and ranging from 0 to 4, and each m being the same or different and ranging from 0 to 2, with the proviso that when Z is halogen or hydroxy, the X substituents, being the same or different, are alkyl having from 1 to 18 carbons, and preferably from 4 to 10 carbons, $SO_2NR_8R_9$, $NR_8R_9$, $NR_{10}COR_{11}$, $SR_{11}$ or $OR_{10}$, wherein $R_8$ is H; alkyl having from one to about 18 carbons and preferably from one to about 8 carbons; or aryl having from 6 to 10 carbons, $R_9$ is alkyl having from one to 18 carbons and preferably from one to about 8 carbons; or aryl having from 6 to 10 carbons; or $R_8$ and $R_9$ can be taken together to form a heterocyclic ring containing the N atom and containing from 4 to 7 members, and preferably from 5 to 6 members, and where the X substituent is attached to the aromatic ring through the N atom when the substituent is $NR_8R_9$;

$R_{10}$ is H; alkyl having from one to about 18 carbons and preferably from one to about 8 carbons; or aryl having from 6 to 10 carbons, and $R_{11}$ is alkyl or aryl as defined for $R_{10}$.

It is preferred that there be at least one Z substituent in the novel naphthalocyanine chromophores of the present invention. Both types of substituents, however, X and Z, may be present. It is the Z substituent which provides the major solubility characteristics to the dye, while the X substituents contribute primarily to the fine-tuning of the absorption maximum of the dye. It is preferred that the X substituents, the number and type, be selected so as to result in an absorption maximum for the dye which corresponds to the output wavelength of the laser to be used in the optical recording.

Thus, through the combination of the particular Z and X substituents of the novel chromophores of the present invention, there is obtained a novel compound exhibiting unique spectral and solubility characteristics. The unique solubility characteristics ar particularly important with regard to polymer compatibility. As the more compatible with the polymer, the higher loading achievable and a lesser chance of phase separation. Solubility in the same solvents as the polymer used in the recording layer also permits one to achieve higher loading of the dye in the recording layer, as well as to cast the dye/polymer using conventional techniques. In general, therefore, the novel chromophores of the present invention provide a compound having most desirable spectroscopic and solubility properties for use in an optical recording medium information layer. As well, the novel chromophores also exhibit the chemical and photolytic stability which makes naphthalocyanine chromophores in general so useful in an information layer for an optical recording medium.

In using the chromophores, it is preferred that the chromophores of the present invention be dissolved in a polymer film. Thus it is preferred to either cast a polymer layer o coat a substrate with a polymer/dye film. As noted above, conventional methods of casting may be utilized with the chromophores of the present invention.

Since the read and write steps all require operating within a very narrow depth of focus, the film, when applied, must provide a very flat surface in order to avoid errors and noise. In order to facilitate the coating procedure, it is also generally advantageous that the polymer and dye be soluble in a readily available organic solvent such as an alcohol or ketone. In this regard the polymer and dye should be compatible and mutually co-soluble. Also, upon evaporation of the solvent, the dye should not precipitate in a particulate form, which particulates would cause a scattering of light.

Any suitable coating technique may be used to achieve such a flat surface, with a conventional technique such as spin coating, which allows for a high degree of control of film thickness and flatness, being preferred. It is, of course, important that the polymer form a thin film coating.

In an illustrative recording system embodying the principles of the present invention, a record blank of disk form is subject to rotation at a constant linear or constant angular velocity while a beam of light from a light source, e.g., a laser, is focused on the information dye surface of the disk. The intensity of the light beam is controlled in accordance with the information to be recorded. Illustratively, the control is effected in accordance with carrier waves modulated in frequency by picture-representative video signals, with the light beam intensity varying as a result between a high level sufficient to effect a detectable change in the physical characteristics of the absorptive dye material and a low level insufficient to effect such physical change, the frequency of the level alterations varying as the video signal amplitude changes. Preferred writing speeds are in the range of from $10^6$ to $10^7$ bits per second.

The relative diameter and depth of the holes or pits formed will, of course, depend not only on the optical and thermal properties of the dye information layer, but also on the characteristics of the writing beam, i.e., focused spot diameter, depth of focus, intensity profile and intensity and duration of the writing pulse. Optimization of these parameters is familiar to those skilled in the art.

As a result of the pit-formation in the dye material, an information track comprising a succession of spaced pits is formed in the information surface of the disk, the pits appearing in those surface regions exposed to the high intensity beam. Variations in the length and separation of the pits are representative of the recorded information.

The result of the above-described recording process is the formation of an information record of a form which facilitates recovery of the recorded information by optical playback processes. The information track of such an information record comprises (1) undisturbed surface regions alternating with (2) pit regions formed by the pit forming process, preferably coated on a substrate. This information track can be, for example, in either analog or digital form.

In playback or read operations pursuant to the principles of the present invention, a light beam is focused upon the information track of a rotating information record of the above described type. The playback beam has a constant intensity at a level insufficient to effect recording on the dye layer or erasure of the recorded information by levelling. A photodetector, positioned to receive light reflected from the successive regions of the information track as they pass through the path of the focused light, develops a signal representative of the recorded information.

Several variations in the playback or reading system as known to the art are possible. The most preferred mode of reading information involves the relative reflection between the dye material surface and those areas in which pits have been formed in the recordation of information. When the reflectivity of the dye material surface is of relatively high reflectivity as compared to that of the substrate, the reflectivity in the areas of the pits will be less than in the regions without pits when a beam from the read laser passes thereby. Thus, a written bit can be registered as a decrease in reflected intensity. When the relative reflectivity of the dye material surface is low as compared to that of the substrate, however, the reflectivity in the areas of the pits will be more than in the regions without pits when a beam from the read laser is focused thereon. Accordingly, a written bit can be registered as an increase in reflected intensity.

An advantage of the present invention is that the resulting information medium can also be suitable for erasure. Complete and accurate erasure of recorded information can be readily carried out by heating the medium to a sufficiently high temperature such that the dye material becomes softened sufficiently to allow levelling of the surface. This can be done globally by heating the entire disk in an oven or some other suitable heating means, or by means of a defocused laser beam whose intensity at the surface of the recording layer is intermediate between that of the write beam and read beam. It is generally necessary to heat an area greater than that of a single bit (typically 1 $\mu$m in diameter).

The present invention is further illustrated by the following examples. The details of the following examples, however, are in no way meant to be limitative, but rather merely illustrative.

EXAMPLE 1

Preparation of Dihydroxysilicon tetrachloronaphthalocyanine:

4-Chloro-$\alpha, \alpha, \alpha', \alpha'$,-tetrabromo-o-xylene.

Bromine (7.6 ml) was added over a period of 4.5 hours to 4-chloro-o-xylene (5.0 ml) at 120° C. in direct sunlight. The resultant product was cooled and the suspension formed was filtered by suction. The solid was washed with an ethanol-water solution (1:1) and then dried under vacuum overnight. The product is a white solid. Yield 16 g, 92%. 6-Chloro-2,3-naphthalenedicarbonitrile.

A mixture of 4-chloro-$\alpha,\alpha,\alpha',\alpha'$,-tetrabromo-o-xylene (4.83 g), fumaronitrile (1.10 g), sodium iodide (4.77 g) and dimethylformamide (35 ml) was stirred at 80° C. for 5.5 hours. The resulting mixture was cooled to near room temperature and then poured into water (500 ml). Enough $NaHS_3$ (3.5 g) was added to the mixture to discharge the red color and render the mixture light tan. The solid was isolated from the suspension by suction filtration, washed with ether, and then dried under vacuum overnight. The product is a light tan solid. Yield 2.04 g, 97%.

6-Chloro-1,3-d-iiminobenz(f)isoindoline.

Anhydrous ammonia was bubbled through a stirred mixture of 6-chloro-2,3-naphthalenedicarbonitrile (2.08 g), sodium methoxide (0.384 g), and methanol (100 ml) for 50 minutes. With continued ammonia addition, the mixture was refluxed for 3 hours. The solid was isolated from the suspension by suction filtration, washed with ether, and dried under vacuum overnight. The product is a light yellow solid. Yield 1.99 g, 83%.

Dichlorosilicon tetrachloronaphthalocyanine.

6-Chloro-1,3-diiminobenz(f)isoindoline (1.88 g) was added over a period of 15 minutes to a refluxing mixture of $SiCl_4$ (2.0 ml) and quinoline (50 ml). The resultant mixture was allowed to reflux for 45 minutes and then allowed to cool to room temperature. The suspension formed was filtered to isolate a green solid. The solid was washed with methanol, chloroform, pyridine and then dried under vacuum for 1 hour. Yield 1.17 g, 60%.

Dihydroxysilicon tetrachloronaphthalocyanine.

A mixture of dichlorosilicon tetrachloronaphthalocyanine (1.07 g) and concentrated sulfuric acid (40 ml) was stirred for 30 minutes. The brown mixture was poured onto ice (100 g) and the resulting suspension was filtered by suction. The brown solid was washed repeatedly with acetone and water (1:1). A mixture of the solid obtained and concentrated ammonia (30 ml) was refluxed for 1 hour. The green solid product was isolated by suction filtration, washed with water, then acetone, and dried under vacuum overnight. Yield 0.89 g, 87%.

EXAMPLE 2

Preparation of Sulfonamide Substituted Silicon Naphthalocyanines:

A. Dihydroxysilicon polysulfonylchloride naphthalocyanine—$Si(OH)_2[Nc(SO_2Cl)_n]$. A mixture of dihydroxysilicon naphthalocyanine (0.4 g) and chlorosulfonic acid (1.3 ml) was stirred for 6 hours at 65° C. The resultant product was poured onto ice (100 g) which had been cooled with dry ice. The slurry was slowly warmed to melt the ice and then filtered After washing with ice water, the solid was dried under vacuum overnight. Yield 0.66 g.

B. Dihydroxsilicon poly-N-di-n-octylsulfonamidonaphthalocyanine—$Si(OH)_2[Nc(SO_2N((CH_2)_7CH_3)_2)_n]$.

A mixture of the above product (0.50 g) and di-n-octylamine (5.0 ml) was stirred at 63° C. for 2 hours. The product was isolated by suction filtration, washed with acetone, then water, and dried under vacuum overnight. The product is a deep green solid. Yield 0.62 g.

The degree of substitution, n, averages about 5 as indicated by material balance.

C. Bis[trimethylsiloxy] silicon poly-N-di-n-octylsulfonamido naphpthalocyanine—$SiNcX_nZ_2$ where $X=SO_2N((CH_2)_7CH_3)_2$, $n=5$, and $Z=OSi(CH_3)_3$ A mixture of the sulfonamide substituted product above (0.624 g) water (20 ml), and pyridine (100 ml) was refluxed for 1.75 hours. The product was stripped of its volatile components under vacuum and dried under vacuum overnight. A mixture of this product (0.496 9) and pyridine (150 ml) was distilled until most of the pyridine (80 ml) had been removed. Bis(trimethylsilyl) acetamide (2.0 ml) was added and the solution was refluxed for 2 hours. The product was stripped of all its volatile components under vacuum and the solid was washed with hexanes. Yield 0.397 g.

EXAMPLE 3

Preparation of: Bis[hydroxy heptapropyleneoxydimethylsiloxy]silicon tetrachloronaphthalocyanine—$Si[NcCl_4][OSi(CH_3)_2O(CHCH_3—CH_2O)_7H]_2$.

To a dry 500 ml three necked round bottom flask (equipped with magnetic stirring, a Dean-Stark moisture receiver, a reflux condenser, and a dry nitrogen purge) is added 300 ml dry pyridine (freshly distilled from calcium hydride), 2.00 g (2.19 mmol) dihydroxysilicon tetrachloronaphthalocyanine, and 20 ml tri-n-butylamine (dried over 4 A molecular sieves). The mixture is heated to reflux and moisture is removed by azeotropic distillation until the water level (measured by Karl Fischer titration) is below 200 micrograms water per ml distillate. The reaction mixture is allowed to cool to room temperature and 8.0 ml (62 mmol) dichlorodimethylsilane is added via syringe. The mixture is allowed to stir at room temperature overnight (about 18 hr). The next day, the excess dichlorodimethylsilane (b.p. 70° C.) is distilled from the reaction mixture. The distillation is continued until the boiling point of the distillate is greater than 115° C., indicating that all dichlorodimethylsilane is removed. To this reaction mixture is added 1.86 g(4.38 mmol) polypropylene glycol (425 average molecular weight). The stirring mixture is refluxed for 1.75 hours under a blanket of dry nitrogen. The solution is allowed to cool to room temperature, suction filtered (no solid residue), and then stripped of its volatile components under vacuum. The resulting green oil is taken up in diethyl ether, extracted repeatedly with dilute HCl, and then washed repeatedly with water. The ether solution is dried ove calcium sulfate and then the ether is stripped off under vacuum. The resulting product would be a green solid that is highly soluble in a number of organic solvents including dichloromethane.

EXAMPLE 4

Preparation of: Bis[trihexyl siloxy] silicon tetrachloronaphthalocyanine—$SiNcX_4Z_2$ where $X=Cl$ and $Z=O-Si(C_6H_{13})_3$.

A mixture of dihydroxysilicon tetrachloronaphthalocyanine (0.66 g), tri-n-hexylsilanol (1.0 ml), tri-n-butylamine (10 ml), and 1,2,4-trimethylbenzene (150 ml) was refluxed for 2.5 hours and then filtered. The filtrate was mixed with 400 ml of a 1:1 ethanol-water solution and then filtered to isolate a green solid. The solid was washed with more ethanolwater solution, then with hexanes, and was finally air dried. Yield 0.138 g, 13%.

EXAMPLE 5

The silicon naphthalocyanine dyes may be incorporated into polymer films by spin coating solutions containing dye and polymer in a suitable solvent. For example, a solution containing 0.1 g $Si(OH)_2Nc-[SO_2N((CH_2)_7CH_3)_2]_n$ and 2 g Emerez-1553 (a dimer acid polyamide purchased from Emery Industries) in 16 g n-butanol was carefully filtered through a 0.5 micrometer pore size membrane filter. Glass or plastic substrates were carefully cleaned to remove surface contaminations, given a final rinse with n-butanol, and then thoroughly dried in vacuum prior to coating. In the spin coating process the substrate was mounted on the spin coater and completely flooded with the green solution. The substrates were then spun at a rate (500 to 5000 rpm) that gave the desired film thickness. The green films were then baked in a vacuum ove at 65° C. for two hours to remove any remaining n-butanol.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. In a recording medium having a layer for the optical recordation of information and for use with a recording laser providing light of a predetermined frequency, the improvement which comprises said information layer comprising a film forming polymer and a chromophore, wherein the chromophore comprises bis-tri-n-hexylsiloxysilicon naphthalocyanine.

2. In a recording medium having a layer for the optical recordation of information and for use with a recording laser providing light of a predetermined frequency, the improvement which comprises said information layer comprising a film forming polymer and a chromophore, wherein the chromophore comprises dichlorosilicon poly-di-n-octylsulfonamidonaphthalocyanine.

3. In a recording medium having a layer for the optical recordation of information and for use with a recording laser providing light of a predetermined frequency, the improvement which comprises said information layer comprising a film forming polymer and a chromophore, wherein the chromophore comprises dihydroxysilicon poly-di-n-octylsulfonamidonaphthalocyanine.

4. In a recording medium having a layer for the optical recordation of information and for use with a recording laser providing light of a predetermined frequency, the improvement which comprises said information layer comprising a film forming polymer and a chromophore, wherein the chromophore comprises bis-tri-n-hexylsiloxysilicon poly-di-n-octylsulfonamidonaphthalo-cynanine.

5. In a recording medium having a layer for the optical recordation of information and for use with a recording laser providing light of a predetermined frequency, the improvement which comprises said information layer comprising a film forming polymer and a chromophore of the structural formula:

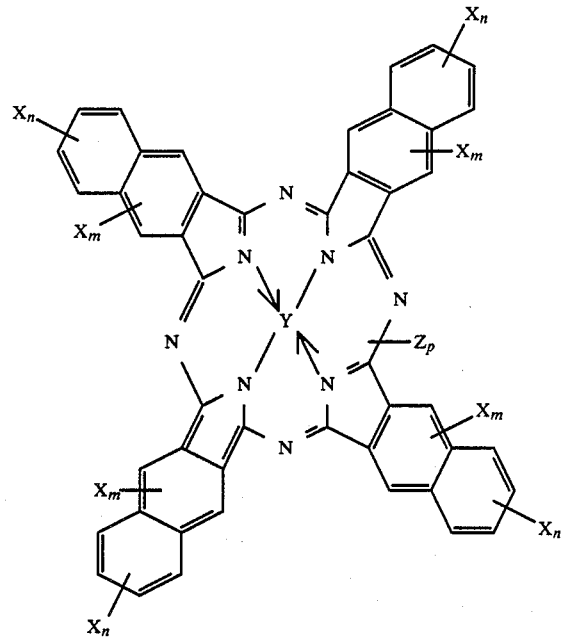

wherein
Y is Si;
Z is halogen, hydroxy, $OR_1$ or $OSiR_2R_3R_4$,
wherein $R_1$ is an alkyl having at least four carbons; aryl having at least 6 carbons; acyl having at least 4 carbons; cycloalkyl having at least four carbons; or a polyether, and wherein $R_2$, $R_3$ and $R_4$ can be the same or different and are alkyl having from 1 to about 8 carbons; aryl having from 6 to 10 carbons; cycloalkyl having at least 4 carbons; siloxy; or alkoxy having at least 3 carbons;

with p representing the number of z substituents and being either 0, 1 or 2; and wherein the X substituents can be the same or different and are independently selected from halogen; alkyl having at least 4 carbons; aryl having from 6 to 10 carbons; acyl having at least 4 carbons; $NR_5R_6$; $NO_2$; $OR_7$; $SO_3$; or $SO_2NR_5R_6$, with $R_5$ and $R_6$ being the same or different and being H; alkyl having from one to about 18 carbons; cycloalkyl having at least 4 carbons; aryl having from 6 to 10 carbons; or with $R_5$ and $R_6$ being taken together to form a heterocyclic ring containing the N atom and containing from 4 to 7 members, and where the x substituent is attached to the aromatic ring through the N atom when the substituent is $NR_5R_6$, $R_7$ is the same as $R_1$ defined above, and with n and m indicating the number of independently selected X substituents, each n being the same or different and ranging from 0 to 4, and each m being the same or different and ranging from 0 to 2.

6. The recording medium of claim 5, wherein p is 2.

7. In a recording medium having a layer for the optical recordation of information and for use with a recording laser providing light of a predetermined frequency, the improvement which comprises said information layer comprising a film forming polymer and a chromophore of the structural formula:

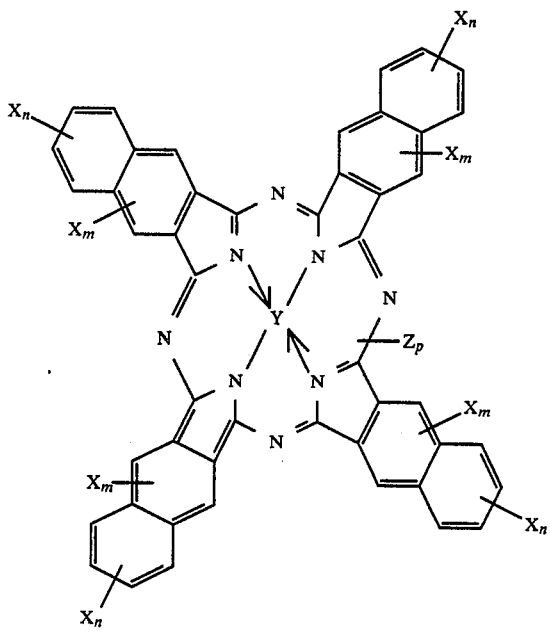

wherein
Y is Si, Ge, Sn, Al, Ga, In or a transition metal;
Z is $OR_1$ or $OSiR_2R_3R_4$,
   wherein $R_1$ is an alkyl having at least four carbons; aryl having at least 6 carbons; acyl having at least 4 carbons; cycloalkyl having at least four carbons; or a polyether, and wherein $R_2$, $R_3$ and $R_4$ can be the same or different and are alkyl having from 1 to about 18 carbons; aryl having from 6 to 10 carbons; cycloalkyl having at least 4 carbons; siloxy; or alkoxy having at least 3 carbons;

with p representing the number of Z substituents and being either 1 or 2; and wherein the X substutuenst can be the same or different and are independently selected from halogen; alkyl having at leaat 4 carbons; aryl having from 6 to 10 carbons; acyl having at least 4 carbons; $NR_5R_6$; $NO_2$; $OR_7$; $SO_3$; or $SO_2NR_5R_6$, with $R_5$ and $R_6$ being the same or different and being H; alkyl having from one to a bout 18 carbons; cycloalkyl having at least 4 carbons; aryl having from 6 to 10 carbons; or with $R_5$ and $R_6$ being taken together to form a heterocyclic ring containing the N atom and containing from 4 to 7 members, and where the X substituent is attached to the aromatic ring through the N atom when the substituent is $NR_5R_6$, $R_7$ is the same as $R_1$ defined above, and with n and m indicating the number of independently selected X substituents, each n being the same or different and ranging from 0 to 4, and each m being the same or different and ranging from 0 to 2.

8. The recording medium of claim 7, wherein p is 2.

9. In a recording medium having a substrate and a layer for the optical recordation of information, for use with a recording laser providing light of a predetermined frequency, the improvement which comprises said information layer comprising a chromophore, wherein the chromophore comprises bis-tri-n-hexyl-siloxysilicon naphthalocyanine.

10. In a recording medium having a substrate and a layer for the optical recordation of information, the information layer being for use with a recording laser providing light of a predetermined frequency, the improvement which comprises said information layer comprising a chromophore, wherein the chromophore comprises dichlorosilicon poly-di-n-octylsulfonamidonaphthalocyanine.

11. In a recording medium having a substrate and a layer for the optical recordation of information, the information layer being for use with a recording laser providing light of a predetermined frequency, the improvement which comprises said information layer comprising a chromophore, wherein the chromophore comprises dihydroxysilicon poly-di-n-octylsulfonamidonaphthalocyanine.

12. In a recordng medium having a substrate and a layer for the optical recordation of information, the information layer being for use with a recording laser providing light of a predetermined frequency, the improvement which comprises said information layer comprising a chromophore, wherein the chromophore comprises bis-tri-n-hexylsiloxysilicon poly-di-n-octyl-sulfonamidonaphthalocyanine.

13. In a recording medium having a substrate and a layer for the optical recordation of information, the information layer being for use with a recording laser providing light of a predetermined frequency, the improvement which comprises said information layer comprising a chromophore of the structural formula;

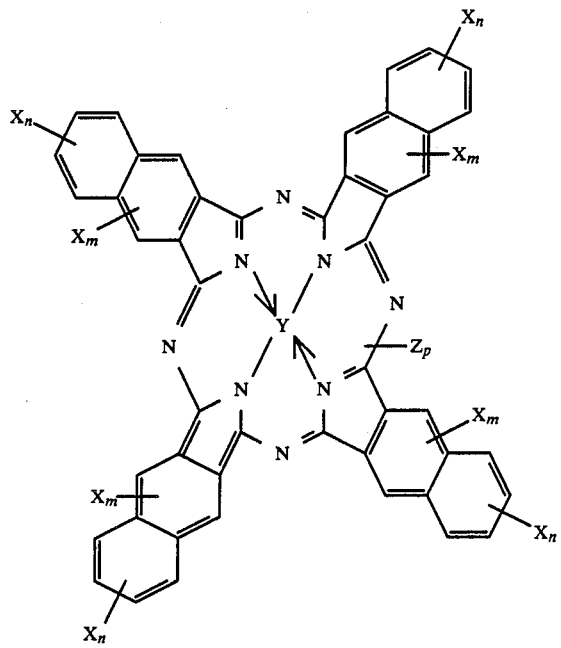

wherein
Y is Si;
Z is halogen, hydroxy, $OR_1$ or $OSiR_2R_3R_4$, aryl having at least 6 carbons; acyl having at least 4 carbons; cycloalkyl having at least four carbons; or a polyether, and
wherein $R_2$, $R_3$ and $R_4$ can be the same or different and are alkyl having from 1 to about 18 carbons; aryl having from 6 to 10 carbons; cycloalkyl having at least 4 carbons; siloxy; or alkoxy having at least 3 carbons;
with p representing the number of Z substituents and being either 0, 1 or 2; and
wherein the X substituents can be the same or different and are independently selected from halogen; alkyl having at least 4 carbons; aryl having from 6 to 10 carbons; acyl having at least 4 carbons; $NR_5R_6$; $NO_2$; $OR_7$; $SO_3$; or $SO_2NR_5R_6$,
with $R_5$ and $R_6$ being the same or different and being H; alkyl having from one to about 18 carbons; cycloalkyl having at least 4 carbons; aryl having from 6 to 10 carbons; or with $R_5$ and $R_6$ being taken together to form a heterocyclic ring containing the N atom and containing from 4 to 7 members, and where the X substituent is attached to the aromatic ring through the N atom when the substituent is $NR_5R_6$,
$R_7$ is the same as $R_1$ defined above, with n and m indicating the number of independently selected X substituents, each n being the same or different and ranging from 0 to 4, and each m being the same or different and ranging from 0 to 2.

14. The recording medium of claim 13, wherein p is 2.

15. In a recording medium having a substrate and a layer for the optical recordation of information, the information layer being for use with a recording laser providing light of a predetermined frequency, the improvement which comprises said information layer comprising a chromophore of the structural formula:

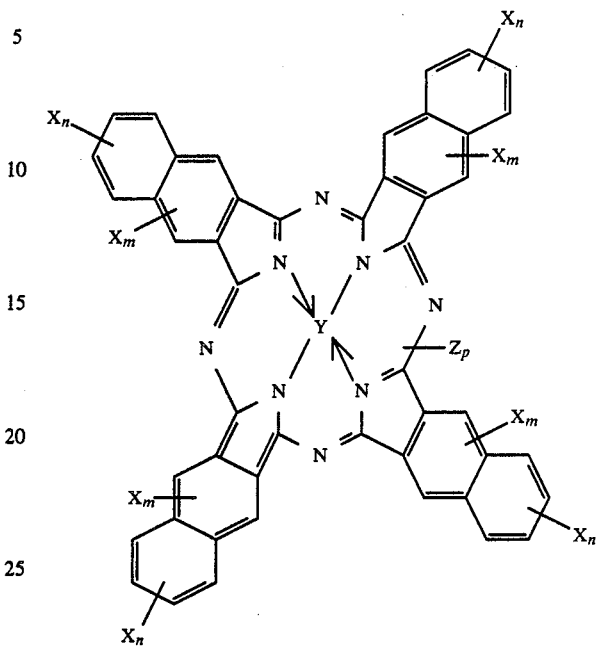

wherein
Y is Si, Ge, Sn, Al, Ga, In or a transition metal;
Z is $OR_1$ or $OSiR_2R_3R_4$,
wherein $R_1$ is an alkyl having at least four carbons; aryl having at least 6 carbons; acyl having at least 4 carbons; cycloalkyl having at least four carbons, or a polyether, and
wherein $R_2$, $R_3$ and $R_4$ can be the same or different and are alkyl having from 1 to about 18 carbons; aryl having from 6 to 10 carbons; cycloalkyl having at least 4 carbons; siloxy; or alkoxy having at least 3 carbons;
with p representing the number of Z substituents and being either 1 or 2; and
wherein the X substituents can be the same or different and are independently selected from halogen; alkyl having at least 4 carbons; aryl having from 6 to 10 carbons; acyl having at least 4 carbons; $NR_5R_6$; $NO_2$; $OR_7$; $SO_3$; $SO_2NR_5R_6$,
with $R_5$ and $R_6$ being the same or different and being H; alkyl having from one to about 18 carbons; cycloalkyl having at least 4 carbons; aryl having from 6 to 10 carbons; or with $R_5$ and $R_6$ being taken together to form a heterocyclic ring containing the N atom and containing from 4 to 7 members, and where the X substituent is attached to the aromatic ring through the N atom when the substituent is $NR_5R_6$,
$R_7$ is the same as $R_1$ defined above, and with n and m indicating the number of independently selected X substituents, each n being the same or different and ranging from 0 to 4, and each m being the same of different and ranging from 0 to 2.

16. The recording medium of claim 15, wherein p is 2.

* * * * *

UNITED STATES PATENT AND TRADEMARK OFFICE
CERTIFICATE OF CORRECTION

PATENT NO. : 4,725,525

DATED : February 16, 1988

INVENTOR(S) : Malcolm E. Kenney et al.

It is certified that error appears in the above-identified patent and that said Letters Patent is hereby corrected as shown below:

On the title page, Item [73] should read -- Hoechst Celanese Corporation --.

Signed and Sealed this

Nineteenth Day of July, 1988

Attest:

DONALD J. QUIGG

Attesting Officer

Commissioner of Patents and Trademarks